April 27, 1948.     H. A. STRICKLAND, JR     2,440,309
CAPACITOR TRANSLATING SYSTEM
Filed Jan. 25, 1944     2 Sheets-Sheet 1

INVENTOR
Harold A. Strickland, Jr.
BY John R. Tarbox
ATTORNEY

April 27, 1948.  H. A. STRICKLAND, JR  2,440,309
CAPACITOR TRANSLATING SYSTEM
Filed Jan. 25, 1944   2 Sheets-Sheet 2
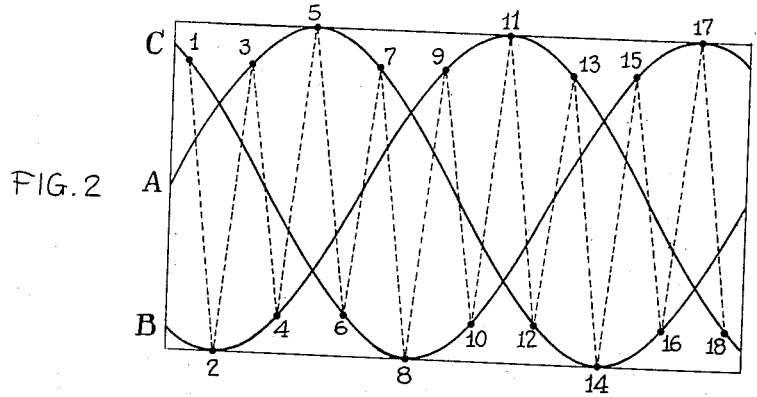
FIG. 2
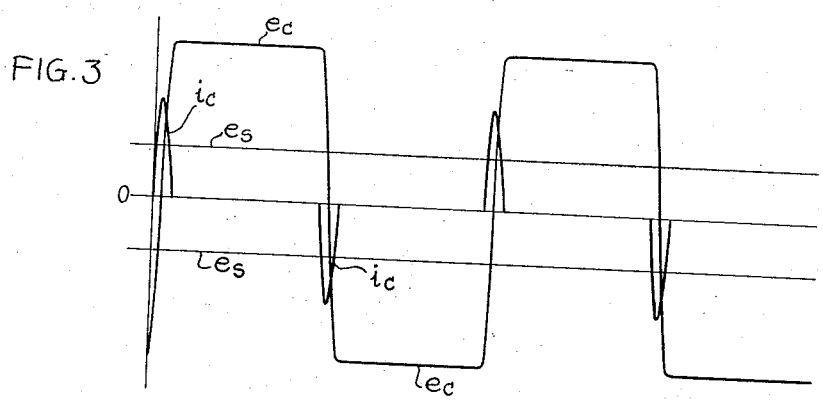
FIG. 3
FIG. 4
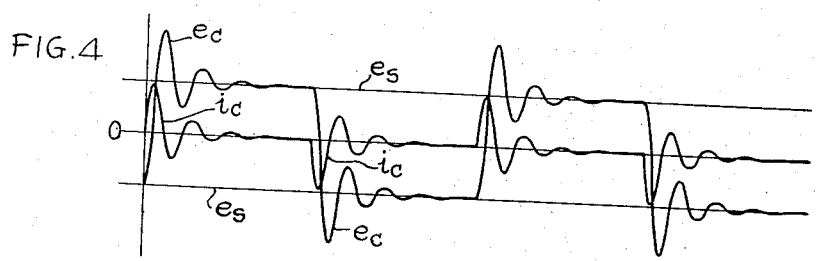
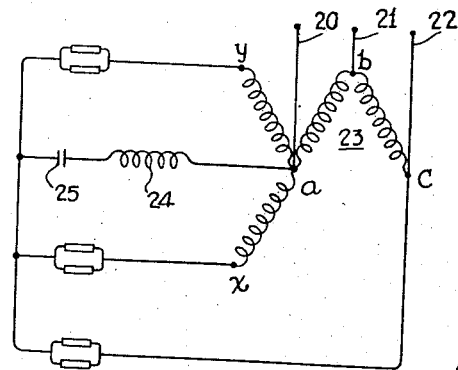
FIG. 5
INVENTOR
Harold A. Strickland Jr.
BY John P. Tarbox
ATTORNEY Patented Apr. 27, 1948

2,440,309

UNITED STATES PATENT OFFICE 2,440,309

CAPACITOR TRANSLATING SYSTEM

Harold A. Strickland, Jr., Detroit, Mich., assignor, by mesne assignments, to The Ohio Crankshaft Company, Cleveland, Ohio, a corporation of Ohio Application January 25, 1944, Serial No. 519,637

13 Claims. (Cl. 320—1)

This invention relates to electric energy translating systems for supplying heating or other useful energy from a commercial source without the use of expensive or complicated intervening devices.

In many manufacturing processes such as those involving induction heating, it is commonly requisite to employ high voltage rotating generators having frequencies ranging up to 10,000 cycles in connection with switching equipment, the original cost of which is frequently prohibitive. In many uses also portability of equipment is a prime factor which can be met only by elimination of heavy apparatus.

It is accordingly an important object of this invention to provide energy translating equipment which utilizes apparatus of such reduced weight as to permit portability. Another object is to provide equipment which may be utilized with commercial power without expensive external transformers. A related object is to provide a power unit which may be assembled in a single compact unit. A further object is to provide a source of heating power which can generate effective heating frequencies higher than the commercial limits of rotating equipment.

Additional important objects of the invention are to provide the following structure and methods: apparatus for energy transfer without important moving parts; apparatus which may be readily adapted to different uses; circuit devices permitting easy control by a single control element; means for controlling the pattern of heat without altering the power output; equipment readily associated with standard elements of analogous equipment; means for eliminating parts of equipment previously considered necessary, such as a contactor, without eliminating the function of the equipment; means for producing equally high frequency powers from 25 cycle power circuits, for example, as from 60 cycle circuits, a feature not easily obtainable in rotating equipment.

Other objects include provision of means for readily modifying the power output, and for changing automatically the degree of charge penetration of the heating current where the charge material is magnetic.

In addition a primary object of the invention is to provide novel and effective means for employing the voltages of the different phases of a polyphase power circuit. Of importance also, is the provision of circuit arrangement which permits multiple withdrawals of transient discharge impulses in a single half-cycle of current alternation, and at voltages in excess of the normal line voltages. The provision of means whereby the capacitor discharge is always to the phase point of maximum potential difference is also of importance.

The above and other related objects are accomplished by the method, circuit, and associated apparatus hereinafter described, and illustrated in the accompanying drawings in which:

Fig. 2 is a view illustrating the frequency and magnitude of transient discharges;

Figs. 3 and 4 are diagrammatic showings of capacitor voltage and current transients; and Fig. 5 is a simplified showing of the circuit connections.

Figure 1:
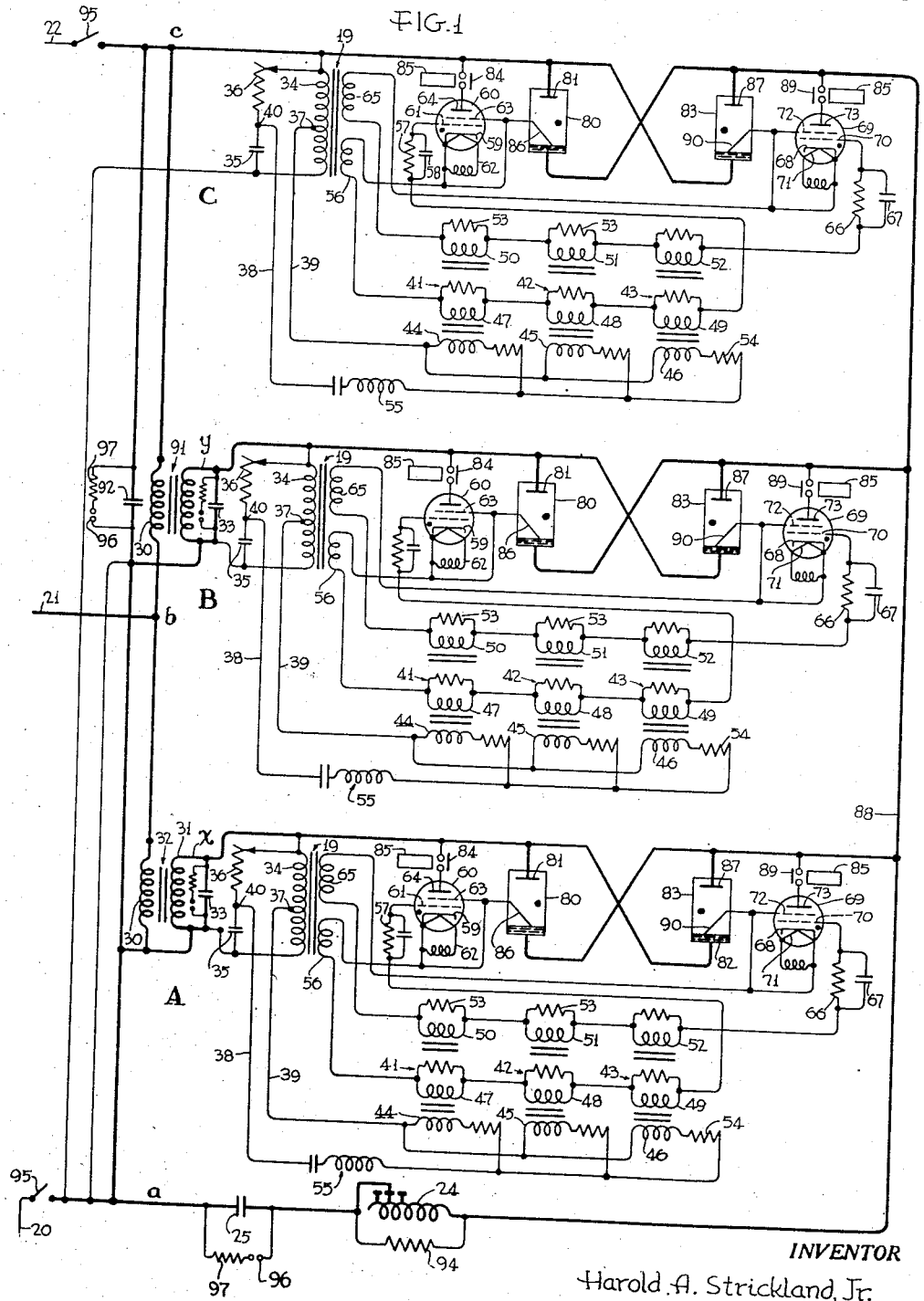
Fig. 1 is a circuit diagram of the invention.

Referring to Fig. 5 conductors 20, 21 and 22 indicate three-phase commercial power connections, the voltage value between conductors being assumed for illustrative purposes as 460 volts in a delta connection indicated at 23, a common power source in industrial plants. The delta terminals are termed $a$, $b$ and $c$. In order to associate the load, here indicated as the induction heating coil 24, with an enhanced voltage and to provide a common connection for the load with the switch phase, a Y-connection is made to the delta mesh with the neutral point at $a$, and end points $c$, $x$, $y$, there being a transformer connection in delta branches $a$—$b$ and $b$—$c$ only, to form the two Y-arms $ay$—$ax$ the third arm being delta branch $a$—$c$. In this manner the phase voltage between adjoining Y conductors is increased over the delta phase voltage alone. This voltage is effective across the load capacitor 25 as shown in the diagram.

The root mean square voltage available for the load circuit is only 460 volts, but if the delta circuit is used with a superimposed Y as indicated by the adjoined diagram

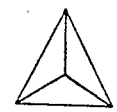

the voltage from the neutral to the delta junction would be $$\frac{460}{\sqrt{3}}$$

It is therefore to get 460 volts and a common phase point that we use the suggested circuit. It is quite possible to use a conventional transformation, but to do so requires approximately 50% more kilovolt amperes of transformer which demands proportionally more space and cost.

Proceeding with the elementary description of the circuit, and assuming an initial energization of the circuit, as at point 5 in Fig. 2, the voltage on the capacitor rises from zero to the point $e_s$ representing the maximum instantaneous line voltage. At this point the current through the heating coil 24 and charging capacitor 25 is approximately a maximum and is just starting to fall, thus inductively adding a voltage increment lifting the voltage in the capacitor 25 to the value $e_c$. At this point the charging current becomes zero and the circuit ignitron normally breaks the circuit leaving the capacitor charged at the value $e_c$, substantially in excess of the line voltage from point 5 of Fig. 2.

The voltage $e_c$ represents the value to zero, developing in the first phase cycle from zero. However, if a second discharge occurs as at point 14, in Fig. 2, in this negative half-cycle of the curve this will be the zero point for the condenser 25 for the next reverse peak discharge, thus establishing a voltage value substantially double the original value. Hence, by providing a suitable circuit I have been able to utilize this magnified voltage in the capacitor-inductor load circuit without employing amplifying transformers or other step-up equipment. As worked out practically, the voltage discharge points are across phase and multiple discharge points are employed in each half-cycle to increase the sum of energy transfer in a unit of time. Fig. 2 illustrates an eighteen cross-phase discharge arrangement in the time of one cycle of a three-phase power supply, the dotted lines merely emphasizing the order, and phase points, of tube firing.

In Fig. 1 is diagrammatically indicated a circuit arrangement which I have found practical as accomplishing effectively the objects of my invention. There appears in this drawing three essentially similar branch circuits designated A, B and C, the A circuit being associated with the $a$—$b$ delta branch, B with the $b$—$c$ branch, and C with the $c$—$a$ branch. Details will first be given on the A branch circuit.

The neutral point $a$ on power line 20 connects directly to the primary 30 and secondary of transformer 32. The secondary 31 of transformer 32 is shunted by a capacitor 33 and a primary 34 of a transformer 19. The primary 34 forms a center-tapped voltage supply of a phase shifting mesh which includes the capacitor 35 and variable resistor 36 connected in series-parallel across the primary 34 of transformer 19. The primary is tapped at 37, its mid-point, and conductors 39 and 38 are led respectively from the tap 37 and a point 40 between capacitor 35 and resistor 36 to the primaries of a group of peaking transformers. In the diagrammatic showing three transformers are indicated, 41, 42 and 43 having primaries 44, 45 and 46 and secondaries 47, 48, 49, 50, 51 and 52, each primary having two secondary coils, and each secondary being bridged by a resistor 53. The transformers are connected in shunt across phase shift points 37—40 and the primaries each include a resistor 54 in series. A resonance filter 55 may be inserted as desired to exclude harmful transient currents.

Secondaries 47, 48, 49 of peaking transformer 41, 42 and 43 are connected in series with each other, with the secondary 56 of transformer 19, and with biasing resistor 57 and capacitor 58 in parallel with resistor 57, to form a branch circuit between the cathode of the firing thyratron tube 60 and the control grid 61 thereof. This tube also includes the cathode heater 62, screen grid 63 and anode 64.

Similarly peaker secondaries 50, 51 and 52 are connected in series with each other, with the secondary 65 of transformer 19, and with biasing resistor and capacitor 66 and 67 to form a branch circuit between cathode 68 of firing thyratron 69 and the central grid 70 of this tube. Tube 69 includes the heater 71, screen grid 72 and anode 73.

Use is made of the pool type gas triode or ignitron for functioning as contactors, two inversely connected tubes being used. Ignitron 80 has its anode 81 connected directly to the Y-terminal of power transformer 31 and to the pool cathode 82 of the second ignitron 83. The plate circuit is also connected to the plate 64 of the thyratron 60 through normally open contact switch 84. The contacts of switch 84 are closed along with the other switch contacts in the thyratron plate circuits when it is desired to have the circuit produce power. These contacts are all operated by a common contactor which is interlocked to prevent operation until thyratrons have heated and water is flowing through the heating coil and ignitrons, the contacting means being generally indicated by the box 85.

The ignitor element 86 of the ignitron 80 is connected to the screen grid 63 and cathode 59 of thyratron 60. The pool cathode of ignitron 80 is connected to anode 87 of ignitron 83 and to the neutral return conductor 88 passing to center tap $a$ through load 24, with its non-linear resistor 94, and load capacitor 25. Switch 89 leads from this ignitron circuit to the plate 73 of thyratron 69. The ignitron ignitor 90 connects to cathode 68 and screen grid 72 of the thyratron 69.

Branch circuits B and C are similar to branch A the point of variation being in the power intake, branch A as previously indicated taking off of power transformer 32, in delta circuit $a$—$b$ and Y-circuit $a$—$x$, branch B off of transformer 91 in delta circuit $b$—$c$ and Y-circuit $a$—$y$, and branch C off of the $c$—$a$ branch common to both A and C circuits, having the interposed capacitor 92. The same numerals apply to common parts. It is noted that the capacitance of capacitors 92 and 33 are substantially in excess of that of the capacitor 25, a value of four times giving good results, although the circuit will operate without capacitors 92 and 33. By-pass circuits, including spark gaps 96 and non-linear resistors 97 for high voltage transient currents, are preferably employed about each of these capacitors.

The operation of the circuit of Fig. 1 will now be detailed assuming the load to be an inductive heating coil 24. On closure of main switches 95 and switches leading to the thyratron filament heating circuit, cooling water supply, and time delay switches, a time interval elapses while the heaters bring the thyratron tubes to operating efficiency. At the end of this interval it is possible to operate firing switches 84 and 89 and the line voltage becomes effective on the firing tubes 60 and 69.

At this point note should be made of the fact that resistors 54 in the peaking transformer primaries are varied in such a manner as to introduce a separation as to time of the peaking impulses for any given setting of the phase shift circuit. For example, in Fig. 2 for the phase shift setting of phase $a$—$x$ in the positive half-cycle three displaced peak impulses appear at 3, 5 and 7 in spaced relationship and on the negative half-cycle voltage impulses appear at 12, 14 and 16. Similarly, for phase $a$—$y$ appear displaced impulse points corresponding to points 9, 11 and 13 and 2, 4 and 18. The impulse points 1, 6, 8, 10, 15 and 17 appear on phase $c$—$a$. More specially by varying the resistance 54 and thus varying phase angles of currents through transformer primaries 44, 45 and 46, the point of core saturation is varied to cause spacing of the peaking impulses in each half-cycle.

In addition to the multiple peaking impulses appearing in each cycle as described, it is important to note that the load capacitor 25, as previously described, receives the line charge to its maximum voltage and the additional inductive charge of the load coil 24; and that at the point of discharge the potential change is to phases which are successively different, that is, subsequent discharges are from phase to phase. This is diagrammatically indicated in Fig. 2 by the dotted lines joining points 1—18 there being eighteen separate transient capacitor discharges for one cycle period. Thus instead of one discharge in a single positive half-cycle as has been common practice heretofore, I secure as desired a greatly enlarged number of discharges, the total energy summation being magnified pronouncedly. This is of vital importance in portable heater units since by this means the weight and cost of the equipment may be substantially reduced. It is noted further that at the point of discharge the discharge is to the outside or perimeter phase thus developing the highest available voltage of discharge.

The mode of operation may be summarized as follows: Assume a positive peaker impulse at point 5 (Fig. 2) in the A phase circuit under initial conditions. The voltage will build up to a value $e_s$ with the current charging the capacitor 25. The current then declines raising the voltage to $e_c$ with the current at zero, cutting off the ignitron and conditioning the capacitor for discharge. The next peaker point 11 (Fig. 2), in phase B is at a voltage difference in excess of that between points 5 and 6, and approximately twice the initial voltage to zero and this voltage is effective in building up a high negative voltage in reverse at the same time passing an energizing current through coil 24. Thereafter, the discharges are repeated from phase to phase.

The discharge is shown by oscillograph plates to be transients having oscillatory discharges of rapid decrements due to the reduced values of inductance and capacitance. The time period of the discharges may, of course, be varied in accordance with the values of L and C. The curves of voltage $e_c$ and current $i_c$ with the accompanying source voltages $e_s$ are indicated in Fig. 3 for one condition where the ignition cuts off at the first drop to zero. Under other conditions, either of operation or to meet special conditions of use, the ignitron may oscillate at the zero point coming to zero with a sharp decrement as shown in Fig. 4. Under these conditions it will be noted that the discharge is at the source voltage which may meet certain requirements of use. Obviously, there may be intermediate curve forms between the showing of Figs. 3 and 4 which may be utilized for special conditions of use.

Modifications of the embodiment of the invention as indicated in Fig. 1 may, of course, be made. While desirable under certain operating circumstance the resonance unit 55 for 60 cycle selection may be omitted. Also the separation of discharge points as fixed by the peaking transformers and the exact number of discharge points per cycle may be varied at will, the number of firings per cycle being limited only by the deionization time of the ignitrons and their firing circuits. Obviously also the precise ignitron control circuit may be modified by employment of other conventional control mechanism.

While the circuit has been described with reference to an induction heating load, its applicability to other loads such as resistance or arc welding is apparent; the heating load, also, may be provided with taps or the like whereby the heat pattern may be varied without modifying the power output.

It is pointed out that the load capacitor 25 is normally a part of standard induction heating equipment and my system imparts an additional useful function to this element. Also the ignitron unit makes unnecessary a magnetic or other contactor as utilized in induction heating systems. The unit is static in the sense that motors or other units with substantial moving parts are not essential. The sum of equipment is moreover small permitting assembly as a portable unit as substantial cost reduction. Use of commercial power also without outside transformers imparts mobility as to place of use.

It is of importance to note further that while the invention has been described in connection with a polyphase power source, with which it has important advantages it may be readily utilized in a single phase system without fundamental modifications. A wide range of heating frequencies are derivable from the described circuit in association with transformer taps or, in connection with, a change in the constant of the load circuit. Frequencies with full power available are possible up to 150,000 cycles, provided the coil turns are not reduced below one turn. The phase shift means is of importance in securing a variation at will of the power output of the system by determination of the points in the source cycle at which the discharge and counter-charge occurs. The frequency of transient impulses has been referred to as variable at will. Where the condition of Fig. 3 obtains it is apparent that the number of impulses may be increased, the only limitation being that the current reach a final zero point before the initiation of the next impulse. This applies to the oscillating form of cut-off as shown in Fig. 5. Thus, discontinuity of current flow in the load circuit is a characteristic of the system.

By the term "fractional cycles" as used in the claims is meant a transient or other variable discharge of current having a time period less than that of the source voltage.

Since details of the circuit may be modified, the scope of the invention is defined by the claims as hereunto appended.

What is claimed is:

1. A power supply circuit comprising a polyphase source of alternating current, a load circuit connected thereto, and means for transmitting current in discontinuous complete pulses to said load circuit from at least two different phases of said source current within the time period of a half-cycle of source current.

2. A power supply circuit comprising a polyphase source of alternating current, a load circuit, a capacitor connected to the load circuit and means for charging and counter-charging said capacitor through said load intermittently at uniform time intervals phase to phase which at the respective times of initiation of charge and countercharge, have the highest potential difference, said discharges being plural within a half-cycle time interval of source current.

3. A power supply circuit comprising a polyphase source of alternating current, a load circuit connected thereto, and means for transmitting energy at plural time intervals in discontinuous complete pulses to said load circuit from at least two different phases of said source current within the time period of a half-cycle of source current, said means including an electronic power tube for each phase of source current, and control means for timing the firing of the tubes.

4. A power supply circuit comprising a polyphase source of alternating current, a load circuit connected thereto, and means for transmitting energy at plural time intervals to said load circuit from at least two different phases of said source current within the time period of a half-cycle of source current, said means including a capacitor connected in said load circuit, rectifying, inversely conducting tubes connected to each phase circuit of said current source and in parallel to said capacitor, and control means for charging and counter-charging said capacitor through said tubes successively at fixed time intervals, said control means comprising peak wave generators connected in each tube circuit for firing said tubes, and, phase shift means connected to said generators for varying the peaking point of said peak generators.

5. A power supply circuit comprising a polyphase source of alternating current, a load circuit, a capacitor connected thereto, and means for charging and counter-charging said capacitor through said load intermittently at uniform time intervals, between diverse phase circuits, between which exists, at the respective times of firing the highest potential difference.

6. The method of supplying intermittent discharges of high frequency to a load circuit from a polyphase alternating current source which comprises forming electrically conducting paths from each of said phases in a determinate order of succession to establish successive potentials in a source connected capacitor, and charging and countercharging the capacitor in each case from a phase conductor through a common load to a different phase conductor.

7. A power supply circuit comprising a source of alternating current, an inductive load circuit and means for transmitting energy in multiple time intervals during each half-cycle of source voltage alternation from the power source to said load circuit, said means including a capacitor in said load circuit, rectifier means connected to said load circuit, control means connected to said rectifier means for charging and countercharging said capacitor through said rectifier means at a plurality of fixed time intervals, and phase shift means for modifying the time in the half-cycle at which the control means is effective to pass current.

8. A power supply circuit comprising a source of alternating current, an inductive load circuit and means for transmitting energy in plural time intervals during each half-cycle of source voltage alternation from the power source to said load circuit, said means including a capacitor connected in series in said load circuit, rectifier means connected to said load circuit, and control means connected to said rectifier means for instigating flow of current from said capacitor through said rectifier means at a plurality of fixed time intervals, said control means including a plurality of peak wave generators connected to said rectifying means, and means for time spacing the peak points of the generators to produce spaced current pulses through the rectifying means in each half cycle of source voltage alternation.

9. A power supply system comprising a source of alternating current, a load circuit connected to said source, and means connected to said circuit and source for supplying to said load fractional cycles of current of greater potential than that of said source current during the time period of one cycle, said means comprising a capacitor in series with said load circuit, and control means connected to said capacitor for discharging said capacitor intermittently during the time period of one cycle.

10. A power supply system comprising a source of alternating current, a load circuit connected to said source, and means connected to said circuit and source for supplying to said load fractional cycles of current of greater potential than that of said source current, of alternatingly opposite polarity and during the time period of one cycle, said means comprising a capacitor in series with said load circuit, and control means connected to said capacitor for discharging said capacitor intermittently during the time period of one cycle.

11. A power supply system comprising a polyphase source of alternating current, a load circuit connected to said source, and means for delivering to said load circuit fractions of cycles of current from successively different voltage phases of alternating polarity, said means comprising a capacitor connected in said load circuit, rectifying means connected to each phase circuit for transmitting therein successively current of opposite polarity, and control means connected to said rectifying means for timing the flow of current through said rectifying means and load circuit in each phase whereby a succession of fractional cycle current pulses are transmitted through said load.

12. A power supply system comprising a source of alternating current, a load circuit, means for transmitting current pulses in plural time intervals during each half cycle of source voltage alternation from the power source to the load circuit, and means for increasing the initial voltage of said intermittent current pulses above source voltage.

13. A power supply system comprising a source of alternating current, a load circuit, means for transmitting current pulses in plural time intervals during each half cycle of source voltage alternation from the power source to the load circuit, and means for increasing the initial voltage of said intermittent current pulses above source voltage, each of said means forming an integral part of the electrical system including said source, whereby a sequence of current pulses once established is uniformly maintained.

HAROLD A. STRICKLAND, Jr.

REFERENCES CITED

The following references are of record in the file of this patent:

UNITED STATES PATENTS

| Number | Name | Date |
|---|---|---|
| 783,651 | Thomson | Feb. 28, 1905 |
| 2,088,490 | Slepian | July 27, 1937 |
| 2,275,635 | Lindenblad | Mar. 10, 1942 |
| 2,306,230 | Somerville | Dec. 22, 1942 |
| 2,329,122 | Leathers et al. | Sept. 7, 1943 |

FOREIGN PATENTS

| Number | Country | Date |
|---|---|---|
| 486,307 | Great Britain | June 1, 1938 |